US007006504B2

(12) United States Patent
Yoon et al.

(10) Patent No.: US 7,006,504 B2
(45) Date of Patent: Feb. 28, 2006

(54) VC MERGING APPARATUS AND METHOD FOR ESTABLISHING/TERMINATING CONNECTION THEREOF

(75) Inventors: Bin-Yeong Yoon, Taejon (KR);
Mi-Jung Yang, Taejon (KR);
Yeon-Kwae Jeong, Taejon (KR);
Whan-Woo Kim, Taejon (KR)

(73) Assignees: Electronics and Telecommunications Research Institute, Taejon (KR);
Korea Telecom, Sungnam-shi (KR)

( * ) Notice: Subject to any disclaimer, the term of this patent is extended or adjusted under 35 U.S.C. 154(b) by 894 days.

(21) Appl. No.: 09/976,458

(22) Filed: Oct. 15, 2001

(65) Prior Publication Data

US 2002/0053071 A1    May 2, 2002

(30) Foreign Application Priority Data

Oct. 23, 2000    (KR)    ................................ 2000-62389

(51) Int. Cl.
H04J 3/02    (2006.01)
(52) U.S. Cl. .................................... 370/395.6; 370/397
(58) Field of Classification Search ............ 370/395.2, 370/395.21, 395.5, 395.51, 395.52, 395.6, 370/395.65, 401, 402, 395.1, 397
See application file for complete search history.

(56) References Cited

U.S. PATENT DOCUMENTS

| 6,069,889 | A | * | 5/2000 | Feldman et al. ............ 370/351 |
| 6,130,889 | A | * | 10/2000 | Feldman et al. ............ 370/397 |
| 6,336,129 | B1 | * | 1/2002 | Ise et al. ..................... 709/201 |
| 6,791,985 | B1 | * | 9/2004 | Ashwood-Smith et al. ........................ 370/395.5 |

FOREIGN PATENT DOCUMENTS

| KR | 1996 043227 | 9/1996 |
| KR | 1997 0024562 | 6/1997 |
| KR | 1997 0045094 | 8/1997 |
| KR | 1998 0042389 | 10/1998 |

OTHER PUBLICATIONS

Indra Widjaja, et al.; *Performance Issues in VC-Merge Capable Switches for Multiprotocol Label Switching*; IEEE Journal on Selected Areas in Communications, vol. 17, No. 6, Jun. 1999.
Bin-Yeong Yun, et al.; ETRI; Dept. of Electronics Engineering, Chung-Nam University, Korea; Proceedings of the 14th KIPS Fall Conference; Study on Operation for VC Merging Equipment (Enclosing the Translation of Abstract); Oct. 13, 2000.

* cited by examiner

*Primary Examiner*—Min Jung
(74) *Attorney, Agent, or Firm*—Mayer, Brown, Rowe & Maw LLP

(57) ABSTRACT

A VC merging apparatus and a method of establishing or terminating connection as well as a recording medium storing instructions for embodying the same method are disclosed. The method of establishing/terminating connection includes the steps of; a) determining a kind of connection with reference to connection parameters according to an order of connection establishment or termination from a central controller; b) establishing/terminating a multi point-to-point connection based on ingress/egress connection labels, if the kind of the connection is a VC merging connection; and c) establishing/terminating a point-to-point connection based on the ingress/egress connection labels, if the kind of the connection is a non-VC merging connection.

23 Claims, 13 Drawing Sheets

FIG. 3

| INGRESS CONNECTION CHANNEL HANDLE | CONNECTION PARAMETER (M,A) | INGRESS CONNECTION LABLE | RSAR CHANNEL IDENTIFIER OF INGRESS CONNECTION | TSAR CHANNEL IDENTIFIER OF INGRESS CONNECTION | EGRESS CONNECTION LABLE | EGRESS CONNECTION CHANNEL HANDLE | RSAR CHANNEL IDENTIFIER OF EGRESS CONNECTION | TSAR CHANNEL IDENTIFIER OF EGRESS CONNECTION |
|---|---|---|---|---|---|---|---|---|
|  |  |  |  |  |  |  |  |  |
|  |  |  |  |  |  |  |  |  |
|  |  |  |  |  |  |  |  |  |

| EGRESS CONNECTION CHANNEL HANDLE | CONNECTION PARAMETER | #Leaf | EGRESS CONNECTION LABLE | RSAR CHANNEL IDENTIFIER OF EGRESS CONNECTION | TSAR CHANNEL IDENTIFIER OF EGRESS CONNECTION |
|---|---|---|---|---|---|
| | | | | | |

VC MERGING APPARATUS AND METHOD FOR ESTABLISHING/TERMINATING CONNECTION THEREOF

FIELD OF THE INVENTION

The present invention relates to a VC (virtual channel) merging apparatus; and, more particularly, to a VC Merging apparatus provided with not only a VC merging function but also with a non-VC merging function for transmitting conventional ATM (Asynchronous Transfer Mode) cells by using an SAR (Segmentation and Reassembly) device in an LSR (Label Switching Router) system of an MPLS (Multi-protocol Label Switching) network, and to a method of establishing/terminating connection in order to apply the SAR device, which is has limitation in connection establishment, to the MPLS network and to a computer readable recording medium storing instructions for embodying the methods.

DESCRIPTION OF THE PRIOR ART

Terms of the present invention are defined as follows.

A label is used to distinguish each channel on an MPLS networkd Here, it stands for VpI (Virtual Path Identification) or VCI (Virtual Channel Identification) value in ATM (Asynchronous Transfer Mode).

An SAR (Segmentation and Reassembly) device includes TSAR, a transmission unit that generates AAL5 (ATM Adaptation Layer 5) and segments it into ATM cells, and RSAR, a reception unit that retrieves AAL5 frames from ATM cells.

An RSAR (Rx Segmentation & Reassembly) outputs data having payload and channel identifier as an over-header by extracting AAL5 frames from ATM cells received from the UTOPIA (Universal Test & Operations PHY Interface for ATM), which is an interface protocol between ATM level and physical level.

Receiving the data having the channel identifier as an over-header, TSAR (Tx Segmentation & Reassembly) generates and, segments an AAL5 frame into ATM cells and outputs them.

Ingress connection is a VCC (Virtual Channel Connection) established at the ingress of a VC merging equipment. Ingress connection is established both at TSAR and RSAR, but data are not transmitted to a route established at the TSAR.

Egress connection is a VCC established at the egress of a VC merging equipment. Egress connection is established both at TSAR and RSAR, but data are not transmitted to a route established at the RSAR.

CH (Channel Handle) is what a local host uses in substitute for label values for easy regulation of all VCCs connection. Also, RSAR attaches a CH value to a retrieved AAL5 frame payload as its over-header, thereby identifying each channel of data outputted outside.

Egress channel handle is a CH value of egress connection.

Ingress channel handle is a CH value of ingress connection.

As for the number of leaves, when a multi point-to-point connection is assigned to egress connection, the number of mapped ingress connection should be presented because a plurality of ingresses are mapped to a single egress connection. Therefore, in case the multi point-to-point is not assigned to egress connection, the number of leaves is zero and in case of point-to-point connection, the number of leaves is 1.

As for root, a multi point-to-point group has a plurality of ingresses and a single egress, since a plurality of ingresses are mapped to one egress in multi point-to-point connection.

An ingress connection label is a VPI/VCI value of an ingress connection.

An egress connection label is a VPI/VCI value of an egress connection.

An RSAR channel identifier is a channel identifier which uses instead of a VCC label value for easy regulation of connection. If a host calls for connection to an RSAR, the RSAR terminates connection establishment and transmits an RSAR channel identifier, which is used instead of a label value, to the host. After establishing connection, using the RSAR channel identifier instead of a label value, the host exchanges information on connection termination or connection status with the RSAR. An RSAR channel identifier includes an RSAR channel identifier of the ingress connection and an RSAR channel identifier of the egress connection.

To establish the ingress connection, the connection should be established both in TSAR and RSAR by the same label. In order to make difference from one another, an RSAR channel identifier of the ingress connection is used instead of an ingress connection label value when the ingress connection is established in the RSAR.

To establish the egress connection, the connection should be established both in TSAR and RSAR by the same label. In order to distinguish the two, an RSAR channel identifier of the egress connection is used instead of an egress connection label value when egress connection is established in the RSAR.

A TSAR channel identifier is a channel identifier TSAR uses instead of a VCC label value for easy regulation of connection. If a host calls for connection to TSAR, the TSAR terminates connection establishment and transmits a TSAR channel identifier, which is used instead of a label value, to the host. After establishing connection, using the TSAR channel identifier instead of a label value, the host exchanges information on connection termination or connection status with RSAR. A TSAR channel identifier includes a TSAR channel identifier of the ingress connection and a TSAR channel identifier of the egress connection.

To establish the ingress connection, the connection should be established both in the TSAR and the RSAR by the same label. In order to distinguish the two, an RSAR channel identifier of the ingress connection is used instead of an egress connection label value when ingress connection is established in the TSAR.

For establishing the egress connection, on the other hand, the connection should be established both in the TSAR and the RSAR by the same label. In order to distinguish the two, an RSAR channel identifier of the egress connection is used instead of an egress connection label value when the egress connection is established in the TSAR.

Connection parameters indicate whether the connection is non-VC merging (point-to-point) or VC merging (multi point-to-point) connection, and the kinds of AAL5 frames being processed.

An MPLS (Multi-Protocol Label Switching) network is a technology that improves speed by giving a label to each packet on the network and transmitting the packet by reading the label in a switching apparatus. It is used for transmitting IP (Internet Protocol) packets at a high speed in ATM, based on the switching of a label in a short and fixed length.

An LSR system, a core router of an MPLS network, is made in order to support not only an ATM service required in conventional ATM exchangers but also to support an IP service effectively. Therefore, the LSR system requires VC merging function additionally, which is not provided with in conventional ATM apparatuses.

The VC merging function of the MPLS system multiplies ATM cells by the AAL5 frame unit according to VCC and generates ATM cell with the identical label, VPI (virtual Path Identification) or VCI (Virtual Channel Identification), for ATM cells with the identical destination. Thus, the number of VCCs available on the MPLS network increases, and the network becomes expansible.

The IETF (Internet Engineering Task Force) suggests two methods for providing a VC merging function.

The first method is to distinguish start and end of an AAL5 frame by using a PT: (Payload Type identifier) of an ATM cell header, interleaving the frames by the frame unit after receiving an entire frame.

The second one is to retrieve an entire AAL5 frame by using an SAR device that retrieves or generates AAL5 frames, and interleaves the frames by the frame unit.

The IETF recommends several types of formats as per the purpose AAL5 frames are used for. So, in case of embodying a VC merging function employing an SAR device, there is a shortcoming of having to figure out the kind of the AAL5 frame used for retrieval and generation of AAL5 frames. Despite the fact, it has an advantage of being capable of connecting AAL5 frame users to each other, as AAL5 frames can possibly be connected.

Generally, an SAR device processing AAL5 frames includes the RSAR and the TSAR. Some SAR devices do not support independent connection establishment in each RSAR and TSAR, when establishing VCC. Therefore, if the connection is established to the level 4 in the RSAR, the connection must be established to the label 4 in the TSAR as well. That is, in case of establishing VCC in an SAR, there is a problem that the connection must be established in both the RSAR and the TSAR, because the RSAR and the TSAR do not support independent connection establishment.

SUMMARY OF THE INVENTION

It is, therefore, an object of the present invention to provide a VC merging apparatus provided not only with a VC merging function but with a non-VC merging function as well for transmitting conventional ATM cells, a method of establishing/terminating VC merging or non-VC merging connection in order to apply the VC merging apparatus adopting an SAR device having limitation in establishing connection to the MPLS network, and a computer readable recording medium storing instructions for embodying the method aforementioned.

In accordance with an aspect of the present invention, there is provided an apparatus for merging virtual connections in an LSR (Label Switching Router) system of an MPLS (Multiprotocol Label Switching) network, comprising:

control means for generating control signals to control an ingress connection or an egress connection in accordance with an order of connection establishment/termination from a central controller;

cell receiving means for establishing/terminating a multi point-to-point (VC merging) or a point-to-point (non-VC merging) connection and attaching an ingress channel handle to a header of cell payload received from upstream, based on the control signals from the control means;

header information converting means for receiving data having a payload and the ingress channel handle as a header from the cell receiving means, reading a TSAR channel identifier of the egress connection by using the ingress channel handle as an address of a lookup memory, and performing header conversion based on the control signals from the control means; and cell transmitting means for establishing/terminating the multi point-to-point (VC merging) or the point-to-point (non-VC merging) connection, receiving data having the TSAR channel identifier of the egress connection and a payload from the header information converting means as a header, segmenting data having the TSAR channel identifier of the egress connection and payload from the header information converting means as a header into cells having an egress connection label as a header or generating cells having an egress connection label as a header according to the multi point-to-point or the point-to-point connection by using the TSAR channel identifier of the egress connection, thereby transmitting the cells them to downstream.

In accordance with another aspect of the present invention, there is provided a connection establishing method of a VC merging apparatus in an LSR (Label Switching Router) system of in an MPLS (Multiprotocol Label Switching) network, the method comprising the steps of: a) determining a kind of connection with reference to connection parameters when the connection is requested to be established by a central controller; b) if the kind of connection is a VC merging connection, establishing a multi point-to-point connection based on an ingress and an egress connection labels; and c) establishing a point-to-point connection based on the ingress and the egress connection labels if the kind of connections is a non-VC merging connection.

In accordance with a further another aspect of the present invention, there is provided a connection terminating method of a VC merging apparatus in an LSR (Label Switching Router) system of an MPLS (Multi protocol Label Switching), the method comprising the steps of: a) determining a kind of a connection with reference to connection parameters according to an order of connection termination from a central controller; b) terminating a multi point-to-point connection based on ingress/egress connection labels, if the kind of the connection is a VC merging connection, and c) terminating a point-to-point connection based on ingress/egress connection labels, if the kind of the connection is a non-VC merging connection.

In accordance with a still further another aspect of the present invention, there is provided a connection establishing/terminating method of a VC merging equipment in an LSR (Label Switching Router) system of an MPLS (Multi protocol Label switching), the method comprising the steps of: a) determining a kind of connection with reference to connection parameters according to an order of connection establishment or termination from a central controller; b) establishing/terminating a multi point-to-point connection based on ingress/egress connection labels, if the kind of the connection is a VC merging connection; and c) establishing/terminating a point-to-point connection based on the ingress/egress connection labels, if the kind of the connection is a non-VC merging connection.

In accordance with a still further another aspect of the present invention, there is provided a computer readable recording medium in a VC merging equipment with a processor, which stores instructions for executing a method for establishing connection in an LSR (Label Switching Router) system of an MPLS (Multi protocol Label Switching), the method comprising the steps of: a) determining a kind of connection with reference to connection parameters when connection is requested to be established by a central controller; b) establishing a multi point-to-point connection based on an ingress or an egress connection labels, if the kind of connection is a VC merging connection; and c) establishing a point-to-point connection based on the ingress or the egress connection labels if the kind of connections is a non-VC merging connection.

In accordance with a still further another aspect of the present invention, there is provided a computer readable recording medium in a VC merging apparatus with a processor, which stores instructions for executing a method for terminating connection in an LSR (Label Switching Router) system of an MPLS (Multi protocol Label switching), the method comprising the steps of: a) determining a kind of a connection with reference to connection parameters according to an order of connection termination from a central controller; b) terminating a multi point-to-point connection based on ingress/egress connection labels, if the kind of the connection is a VC merging connection; and c) terminating a point-to-point connection based on ingress/egress connection labels, if the kind of the connection is a non-VC merging connection.

In accordance with a still further another aspect of the present invention, there is provided a computer readable recording medium in a VC merging apparatus a processor, which stores instructions for executing a method for establishing/terminating connection in an LSR (Label Switching Router) system of an MPLS (Multi protocol Label Switching), the method comprising the steps of: a) determining a kind of connection with reference to connection parameters according to an order of connection establishment or termination from a central controller; b) establishing/terminating a multi point-to-point connection based on ingress/egress connection labels, if the kind of the connection is a VC merging connection; and c) establishing/terminating a point-to-point connection based on the ingress/egress connection labels, if the kind of the connection is a non-VC merging connection.

BRIEF DESCRIPTION OF THE DRAWINGS

The above and other objects and features of the present invention will become apparent from the following description of the preferred embodiments given in conjunction with the accompanying drawings, in which:

FIG. 3 shows an ingress connection table used in the present invention;

DETAILED DESCRIPTION OF THE PREFERRED EMBODIMENTS

Other objects and aspects of the invention will become apparent from the following description of the embodiments with reference to the accompanying drawings.

Figure 1:
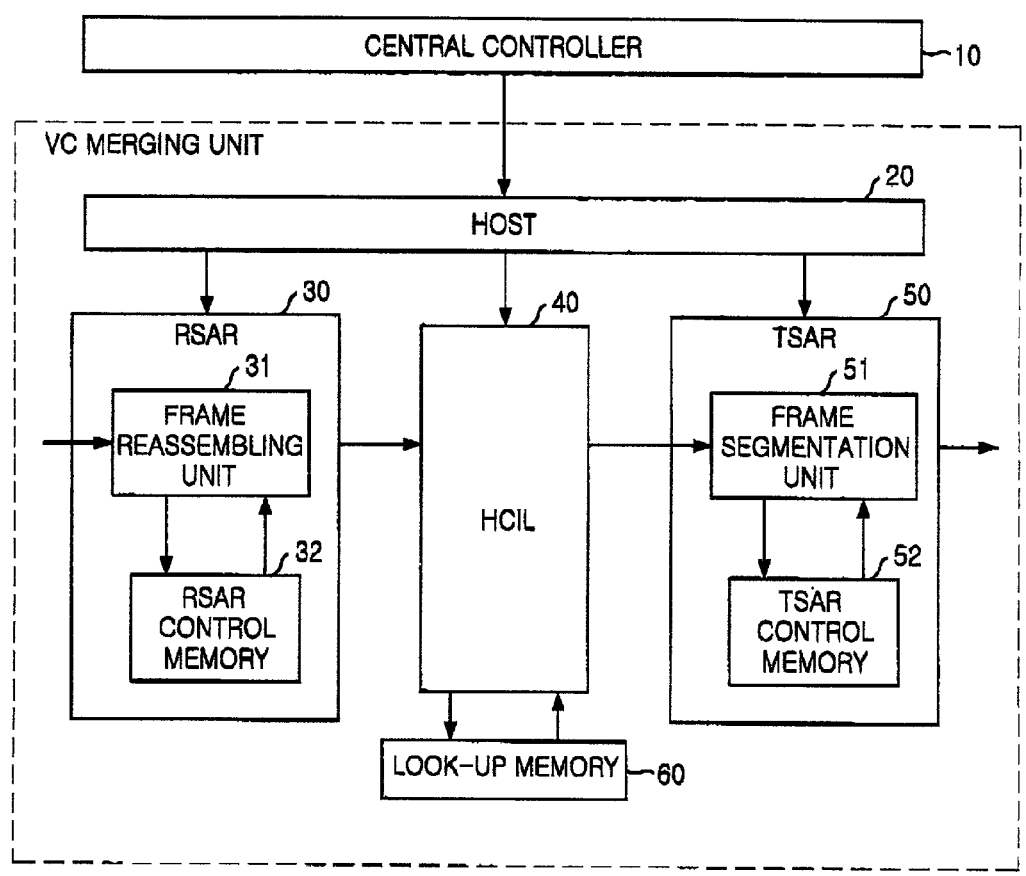
FIG. 1 shows a block diagram of a VC merging apparatus in accordance with an embodiment of the present invention.

FIG. 1 shows a block diagram of a VC merging apparatus in accordance with an embodiment of the present invention.

As shown in FIG. 1, the VC merging apparatus in accordance with the present invention includes a host 20, an RSAR 30, a frame assembling unit 31, an RSAR control memory 32, an HCIL 33, a TSAR 50, a frame segmentation unit 51f a TSAR control memory 52 and a lookup memory 60.

The host 20 receives an order of establishing or terminating a connection from a central controller 10, manages connection of ingress or egress and controls each function block in an LSR system, a core router of an MPLS network. The RSAR 30 establishes or terminates a multi point-to-point (VC merging) or a point-to-point (non-VC merging) connection and attaches an ingress channel handle to the header of cell payload received from upstream, under the control of the host 20, The HCIL 40 receives data having the payload and the ingress channel handle as a header from the RSAR 30, reads a TSAR channel identifier by using the ingress channel handle as an address and referring to lookup memory 60, and conducts header conversion, under the control of the host 20. The TSAR 50 establishes or terminates the connection of multi point-to-point or the point-to-point, receives data having payload and a TSAR channel identifier of the egress connection as a header, either segments it into cells each having an egress connection label as a header according to the multi point-to-point or the point-to-point connection by using the TSAR channel identifier of the egress connection as an address, or generates the cells and transmits them to downstream, under the control of the host.

Figure 2:
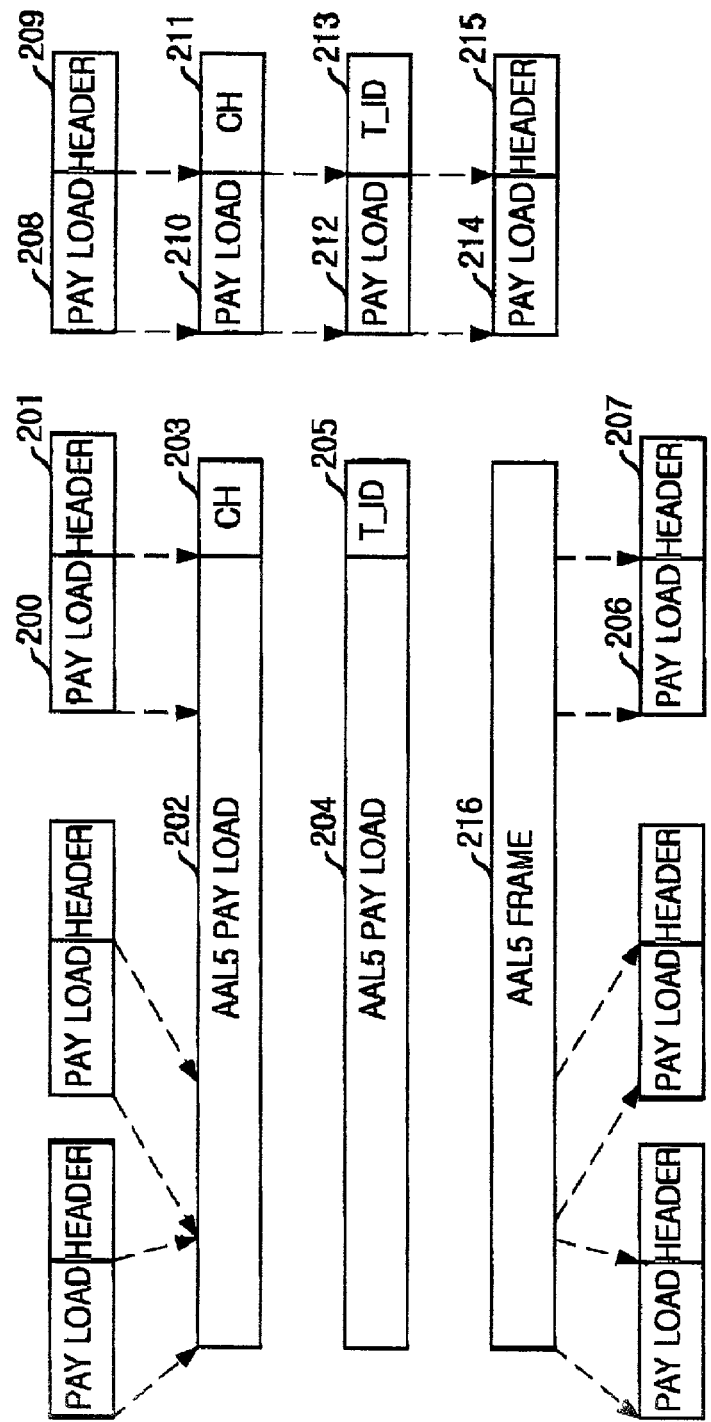
FIG. 2 is a diagram describing a data frame structure used in the present invention.

The function of each element of a VC merging apparatus in accordance with the present invention is established out hereinafter. For convenience, the description will be based on the data frame structure of FIG. 2.

The RSAR 30 includes a frame assembling unit 31 and an RSAR control memory 32.

The host stores reception channel handles and connection parameters in an RSAR control memory 32 according to the kind of connection, when connection is being established.

The frame assembling unit 31 receives ATM cells from upstream and with the ingress channel handles and the connection parameters, it is transmitted from the RSAR control memory 32 by using the labels of VPI/VCI as an address. Here, the connection parameters include distinction of non-VC merging or VC-merging, and the kind of AAL5 frames.

If the frame assembling unit 31 receives MPLS cells, it retrieves AAL5 frames according to the kind of AAL5 frame, attaches the ingress channel handle (CH) 203 to the header of AAL5 payload 202 and transmits them to the HCIL 40.

On the other hand, if the frame assembling unit 31 receives ATM calls of non-VC merging connections it attaches the ingress channel handle (CH) 211 to the header of ATM cell payload without the procedure of retrieving AAL5 frames, and transmits it to the HCIL 40.

The HCIL 40 converts data headers transmitted from the RSAR 30. Here, the header conversion provides a function of mapping header information for multi point-to-point (VC merging), which is capable of transmitting data received from the several channels to the same destination through one channel, or point-to-point (VC merging) for conventional ATM connection.

Whether it's multi point-to-point or just point-to-point connection, the HCIL 40 receives data from the RSAR 30 and reads TSAR channel identifiers 205, 213 from the lookup memory 60 by using ingress channel handles 203, 211 as an address, thereby transmitting the data having the TSAR channel identifiers 205, 213 of the egress connection and the payloads 204, 212 received from the RSAR 30 as a header to the TSAR 50.

The TSAR 50 includes a frame segmentation unit 51 and a TSAR control memory 52.

The TSAR segmentation unit 51 receives data having a TSAR channel identifier of egress connection as a header from the HCIL 40, and is transmitted with egress connection labels 215, 207 and connection parameters from the TSAR control memory 52 by using a TSAR channel identifier 213 of the egress connection as an address. Here, the connection parameters include distinction between non-VC merging and VC-merging as well as the kinds of AAL5 frames.

If it's VC merging connection, the frame segmentation unit 51 generates an AAL5 frame 216 by using the payload 204 transmitted from the HCIL 40, and segments the AAL5 frame 216 into ATM cells having the egress connection label 207 as a header, which are transmitted to downstream.

On the other hand, if the frame segmentation unit 51 receives cells of non-VC merging connection, it generates ATM cells having an egress connection label 215 as a header without converting the payload 212, which are transmitted to downstream.

The TSAR control memory 52 stores connection parameters and egress connection labels for each TSAR channel identifier when the host 20 establishes connection.

Figures 9, 10:
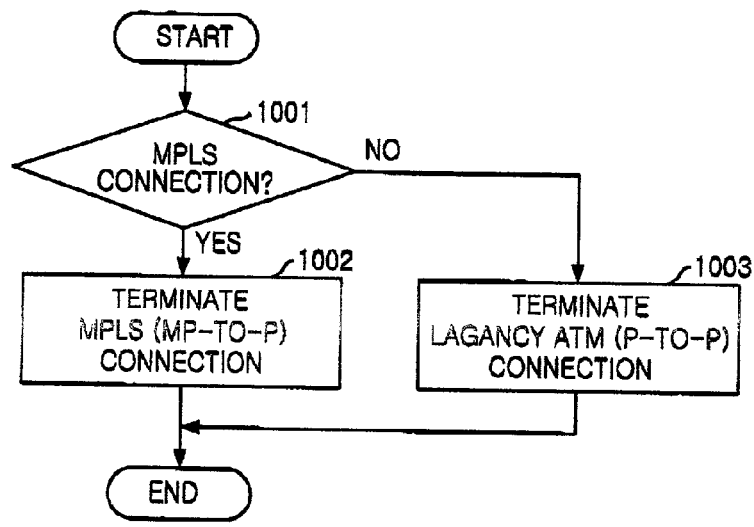
FIG. 9 shows an egress connection table used in the present invention.
FIG. 10 is a flow chart depicting a method of terminating in a VC merging equipment in accordance with an embodiment of the present invention.

The host 20 manages the ingress or the egress connection and controls each function block. To manage the connections, an ingress connection table of FIG. 3 and an egress connection table of FIG. 9 are used for the ingress and the egress connections, respectively. Here, parameters of the two tables, is an ingress connection table of FIG. 3 and an egress connection table of FIG. 9 are as mentioned above.

The host 20 receives an order of establishing or terminating connection from a central control 10 and establishes the ingress or the egress connection in the RSAR 30, the TSAR 50 and the HCIL 40 as follows.

Figure 4:
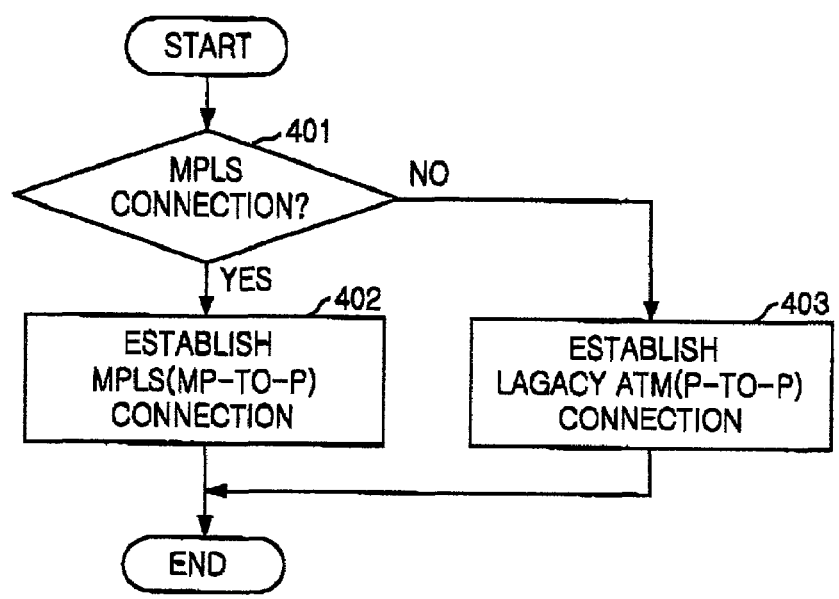
FIG. 4 depicts a flow chart of a method of establishing connection in a VC merging apparatus in accordance with an embodiment of the present invention.

First, referring to FIG. 4, the procedure of connection establishment begins with the central controller 10 requesting to establish a connection to the host 20 by using ingress connection labels, egress connection labels and connection parameters. Here, the host 20 determines whether the connection is non-VC merging or VC merging according to the kind of connection at step 401.

If it's determined to be the VC merging connection, a multi point-to-point connection is established at step 402, and if it turns out to be the non-VC merging connection, a point-to-point connection is established at step 403.

Figure 5A:
FIGS. 5A to 5D illustrate types of establishing multi point-to-point connection, which is VC merging, in accordance with an embodiment of the present invention.
Figure 5B:
Figure 5C:
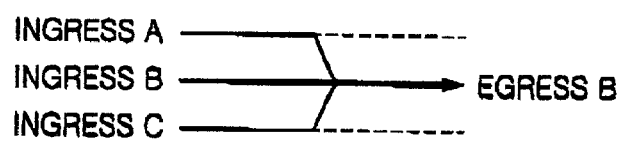
Figure 5D:
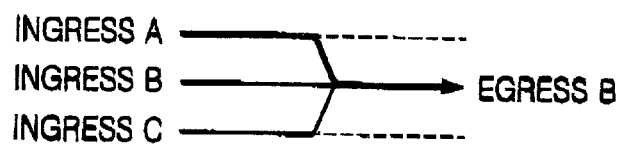
Figure 6:
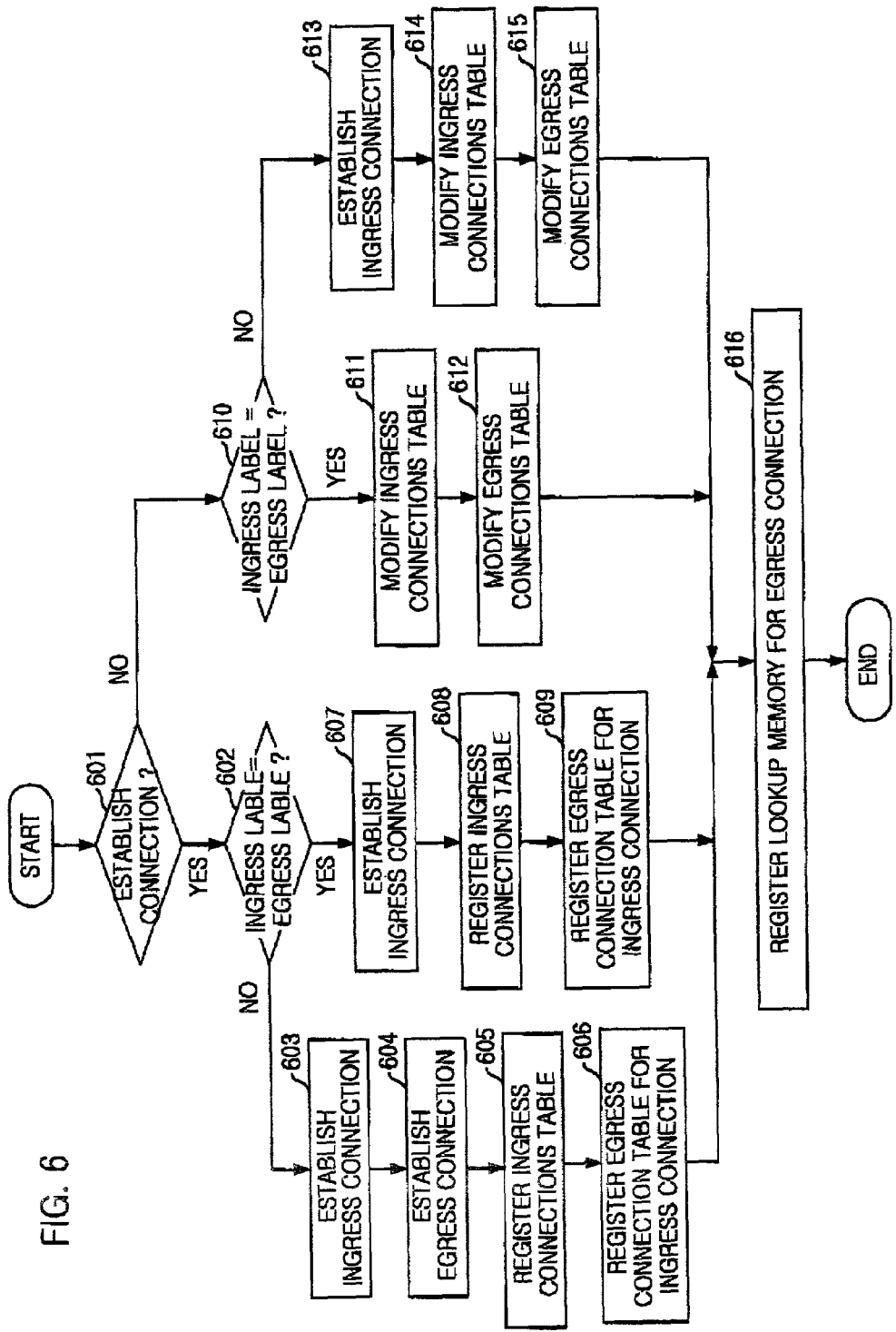
FIG. 6 is a detailed flow chart depicting the procedure of establishing multi point-to-point connection, which is VC merging, in accordance with an embodiment of the present invention.

The multi point-to-point (VC merging) connection has four types as illustrated in FIGS. 5A to 5D, each type of connection establishment goes through the procedure depicted in FIG. 6.

As shown in FIG. 5A, a first type is a procedure of establishing a route connection where the ingress connection label is different from the egress connection label. That is, it's a connection establishing where ingress A is mapped to egress B. Here, two connections of A and B are established in both the RSAR 30 and TSAR 50. The HCIL 40 maps the ingress connection A of the RSAR 30 and the egress connection B of the TSAR 50.

As shown in FIG. 5B, a second type is a procedure of establishing a route connection where the ingress connection label is equal to the egress connection label. That is, the ingress connection and the egress connection have the same label B. A single connection B is established in the RSAR 30 and the TSAR 50, and the HCIL 40 maps the ingress connection B of the RSAR 30 to the egress Connection B of the TSAR 50. There is no virtual connection in this case.

As shown in FIG. 5C, a third type is a procedure of establishing a leaf connection where a label of a new requested ingress connection is equal to that of the egress connection. That is, the virtual SAR ingress connection B is requested to be added to the multi point-to-point connection as a new leaf where the two ingress connections A and C are all connected to the egress B. Here, three connections A, B and C are established in the RSAR 30 and the TSAR 50, respectively, and the HCIL 40 maps to connect A, B and C of the RSAR 30 to the egress connection B of the TSAR 50. The two virtual connections A and C will be left in the TSAR 50.

As shown in FIG. 5D, the fourth type is a procedure of establishing a leaf connection where the ingress and the egress connections have the same label value. That is, a virtual ingress connection A is requested to be added to the multi point-to-point connection as a new leaf where the two ingress connections of B and C are connected to the egress B. Here, three connections A, B and C are established in the RSAR 30 and the TSAR 50, respectively, and the HCIL 40 maps the ingress connections A, B and C of the RSAR 30 to the egress connection B of the TSAR 50.

Referring to FIG. 6, establishment procedure of four types of connections as mentioned above will be described in detail hereinafter.

At step 601 of establishing root connection, it is determined whether the VCC, which is requested to establish connection, is being established as a first connection in the multi point-to-point connection group. That is, it is checked whether or not a new multi point-to-point connection group is formed at this step. If there is an egress connection label already registered in the egress connection table (see FIG. 9). If the egress connection label is already registered on the table, it's not a root because an egress connection already exists. Otherwise, if there is none on the table, it is determined to be a root.

At steps 602 and 610, it is checked whether the ingress and the egress connections have the same label. If the ingress connection label is the same as the egress connection label, only one connection should be established because the ingress and the egress connection labels are the same. However, if the ingress connection label is different from the egress connection label, two connections should be established in the RSAR 30 and the TSAR 50 as shown in FIG. 5A.

At steps 603, 607 and 613, using the ingress connection labels, the connection is established in the RSAR 30 and the TSAR 50 simultaneously. The host 20 transmits connection parameters, the ingress connection labels and the ingress channel handles to the RSAR 30, requesting to establish connections. Then the RSAR 30 terminates the connection establishment and transmits an RSAR channel identifier of the ingress connection (R_ID) to the host 20. Here, the RSAR channel identifier of the ingress connection is used in the RSAR 30 instead of a label value to distinguish channels, Also, the host 20 transmits the connection parameters, the ingress connection labels and the ingress channel handles to the TSAR 50, requesting to establish a connection. Then the TSAR 50 transmits a TSAR channel identifier of the ingress connection to the host 20 after terminating the connection establishment. Here, the TSAR channel identifier of the ingress connection is used in the TSAR 50 instead of a label value to distinguish the channels.

At steps 605 and 608, parameters on the ingress connection are registered on an ingress connection table (see FIG. 3).

At step 604, using the egress connection label, connections are established in both RSAR 30 and TSAR 50 simultaneously. The host 20 transmits the connection parameters, the egress connection label and the egress channel handle to the RSAR 30, requesting to establish a connection. Then the RSAR 30 transmits an RSAR channel identifier of the egress connection to the host 20 after terminating the connection establishment. Here, the RSAR channel identifier of the egress connection is used in the RSAR 30 instead of an egress connection label value to distinguish the channels.

Also, the host 20 transmits connection parameters, egress connection labels and egress channel handles to the TSAR 50, requesting to establish connection. Then the TSAR 50 transmits a TSAR channel identifier of egress connection to the host 20 after terminating the connection establishment. Here, the TSAR channel identifier of egress connection is used in the TSAR 50 instead of a label value to distinguish the channels.

At steps 606 and 609, parameters on the egress connection are registered in an egress connection table (see FIG. 9). Here, the number of the ingress connections, which is a leaf, is registered to be 1.

At steps 611 and 614 of modifying the registration of the ingress connection table, the number of the ingress connections, leaves, increases by as much as 1, because a leaf is added.

At steps 612 and 615 of modifying the registration of the egress connection table, the number of the ingress connections, leaves, increases by as much as 1 for the egress connection of an egress connection table (see FIG. 9), because a leaf is added.

At step 616 of registering a lookup memory, using the ingress channel handle as an address, a TSAR channel identifier of the egress connection is registered in the lookup memory 60.

Figure 7A:
FIGS. 7A and 7B show types of establishing point-to-point connection, which is non-VC merging, in accordance with an embodiment of the present invention.
Figure 8:
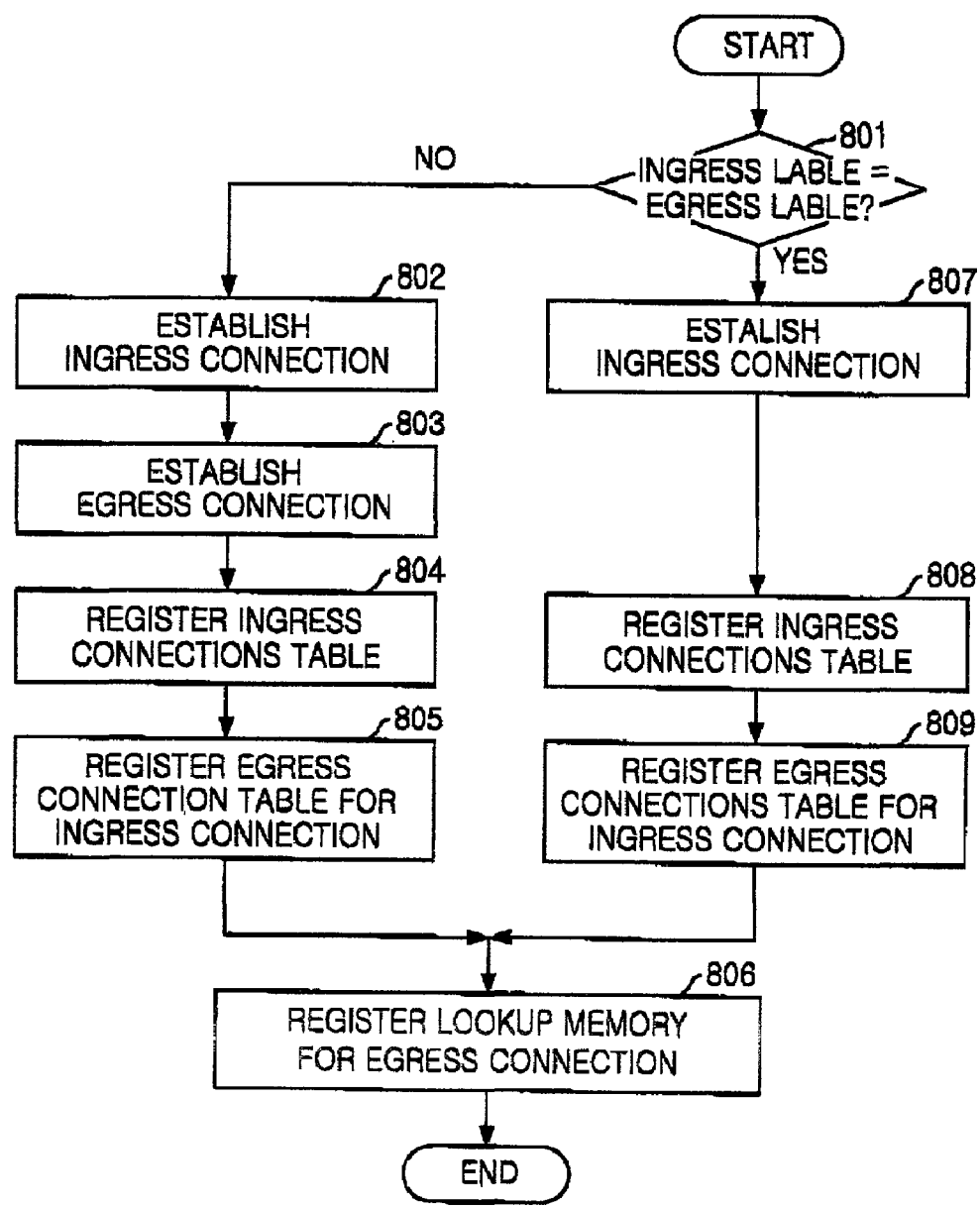
FIG. 8 illustrates a detailed flow chart of the procedure of establishing point-to-point connection, which is non-VC merging, in accordance with an embodiment of the present invention.

Meanwhile, the point-to-point connection (non-VC merging) doesn't have the idea of root and leaf as in multi point-to-point (VC merging) connection, and as shown in FIGS. 7A and 7E, it has two connection types, each connection is established through the procedure of FIG. 8.

Figure 7B:

One is, as shown in FIG. 7A, a connection procedure where the ingress connection label is different from the egress connection label, The other is, as shown in FIG. 7B, a connection procedure where the ingress and the egress connection have the same label.

Referring to FIG. 3, more detailed description is established forth hereinafter.

At step 801, it is determined whether the ingress and the egress connections have the same label. If they do, only one connection is established, as ingress and egress connections are the same. If they don't, two connections are required to be established.

At steps 802 and 807 of establishing ingress connection, using the ingress connection labels, connections are established in both the RSAR 30 and the TSAR 50 simultaneously. The host 20 transmits the connection parameters, the ingress connection labels and the ingress channel handles to the RSAR 30, requesting to establish the ingress connection. Then the RSAR 30 transmits an RSAR channel identifier of the ingress connection to the host 20 after terminating the connection establishment. Here, the RSAR channel identifier of the ingress connection is used in the RSAR 30 instead of a label value to distinguish the channels. Also, the host 20 transmits the connection parameters, the ingress connection label and the ingress channel handle to the TSAR 50, requesting to establish the ingress connection. Then the TSAR 50 transmits a TSAR channel identifier of the ingress connection to the host 20 after terminating the connection establishment. Here, the TSAR channel identifier of the ingress connection is used in the TSAR 50 instead of a label value to distinguish the channels.

At steps 804 and 808 of registering the ingress connection, the parameters on the ingress connection are registered on an ingress connection table (see FIG. 3).

At step 803 of establishing the egress connection, using an egress connection label, connections are established in both RSAR 30 and TSAR 50 simultaneously. The host 20 transmits the connection parameters, the egress connection labels and the egress channel handles to the RSAR 30, requesting to establish a connection, Then the RSAR 30 transmits an RSAR channel identifier of the egress connection to the host 20 after terminating the connection establishment. Here, the RSAR channel identifier of the egress connection is used in the RSAR 30 instead of an egress connection label to distinguish the channels. Also, the host 20 transmits the connection parameters, the egress connection label and the egress channel handle to the TSAR 50, requesting to establish a connection. Then the TSAR 50 transmits a TSAR channel identifier of the egress connection to the host 20 after terminating the connection establishment. Here, the TSAR channel identifier of the egress connection is used in the TSAR 50 instead of a label value to distinguish the channels.

At steps 805 and 809 of registering the egress connection, the parameters on egress connection are registered in an egress connection table (see FIG. 9). Here, the number of the leaves is registered to be 1.

At step 806 of registering a lookup memory, using the ingress channel handle as an address, a TSAR channel identifier of the egress connection is registered in a lookup memory 60.

Connection terminating procedure of the VC merging apparatus is established forth hereinafter.

Referring to FIG. 10, in the connection terminating procedure, a central controller 10 requests to terminate the connection having the ingress connection label and the connection parameters to a host 20. Then, at step 1001, the host 20 determines whether it's a non-VC merging or a VC merging connection by the connection parameters.

At step 1002, if it's determined to be the VC merging connection, the multi point-to-point connection is terminated. At step 1003, if it turns out to be the non-VC merging, the point-to-point connection is terminated.

Figure 11A:
FIGS. 11A to 11D show types of terminating multi point-to-point connection, which is VC merging, in accordance with an embodiment of the present invention.
Figure 11B:
Figure 11C:
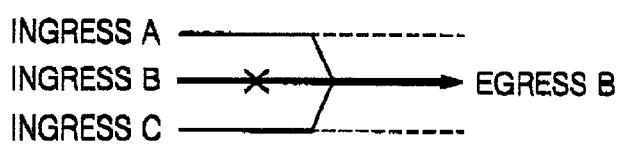
Figure 11D:
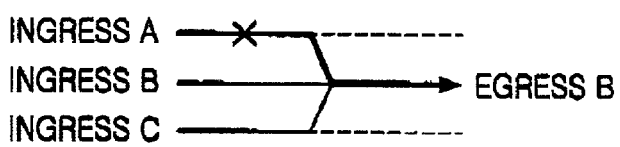
Figure 12:
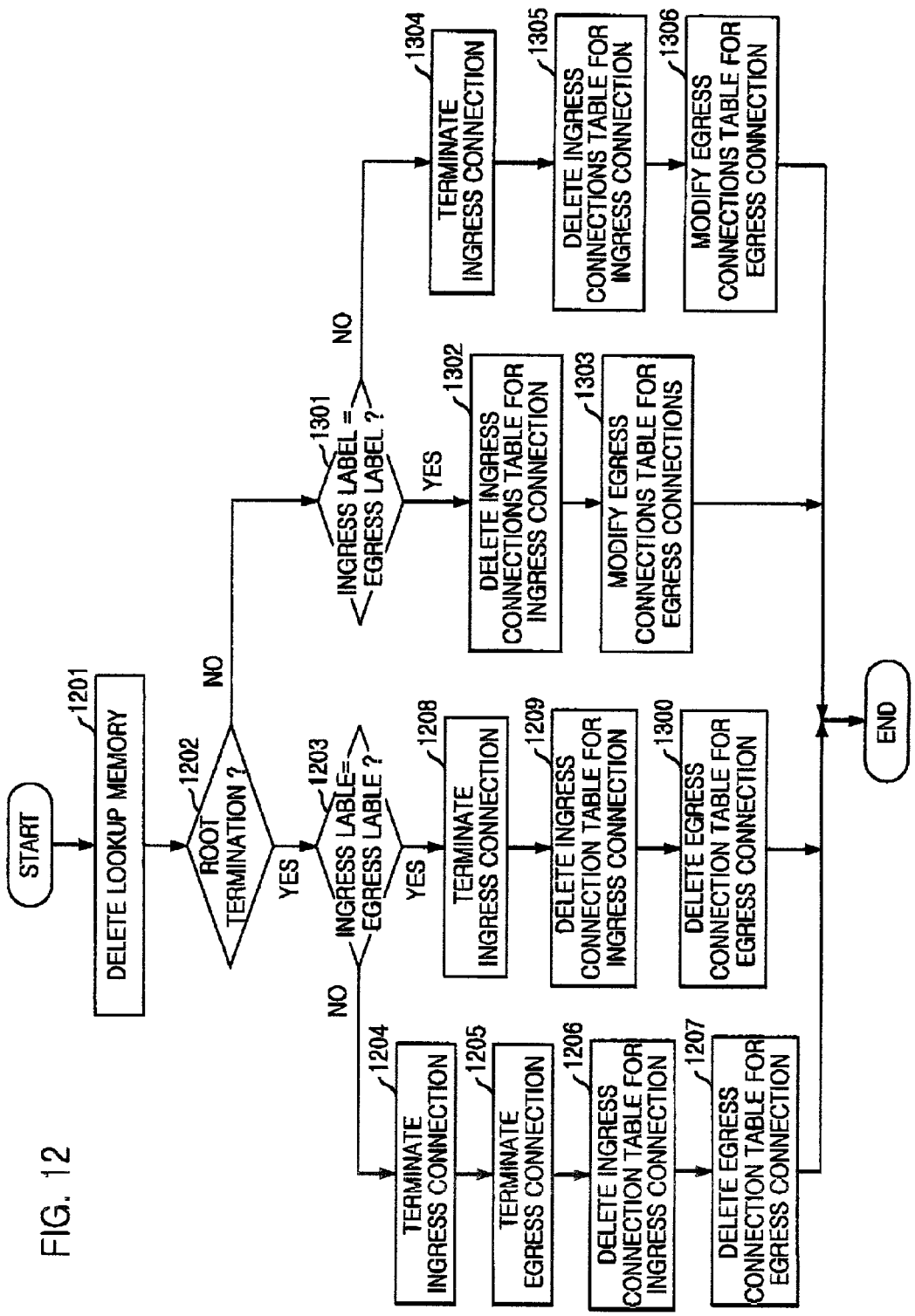
FIG. 12 is a detailed flow chart depicting the procedure of terminating multi point-to-point connection, which is VC merging, in accordance with an embodiment of the present invention.

The multi point-to-point (VC merging) connection has four types as shown in FIGS. 11A to 11D, and each connection is established and proceeded as depicted in FIG. 12.

As shown in FIG. 11A, a first type is a route terminating procedure where the ingress connection label is different from the egress connection label. That is, since a connection mapped from the ingress connection A to the egress connection B is requested to be terminated, a multi point-to-point connection terminates. Here, two connections of A and B established in the RSAR 30 and the TSAR 50 are deleted, and the HCIL 40 removes the ingress connection A of the RSAR 30 and the egress connection B of the TSAR 50 in the lookup memory.

As shown in FIG. 11B, a second type is a route connection terminating procedure where the ingress and the egress connections have the same label. That is, the ingress connection B and the egress B are requested to be terminated. Here, the single connection B established in both RSAR 30 and the TSAR 50 is deleted and the HCIL 40 removes the connection B of the RSAR 30 and the TSAR 50 in the lookup memory.

As shown in FIG. 11C, a third type is a leaf connection terminating procedure where the ingress connection label is equal to the egress connection label. That is, the ingress connection B, which is the same as the egress connection is requested to be deleted from a multi point-to-point connection where three ingress connections of A, B and C are connected to egress B. Here, with the three connections all already established in both the RSAR 30 and the TSAR 50, the connection B of the RSAR 30 is deleted in the HCIL 40, thereby the connections A and C are mapped to be connected to the TSAR 50. The connection B becomes a virtual SAR connection is RSAR 30.

As shown in FIG. 11D, the fourth type is a leaf connection terminating procedure where the ingress connection is different from the egress connection. That is, the ingress connection A is requested to be deleted from the multi point-to-point connection where three ingress connections A, B and C are connected to the agress B. Here, with the three connections all already established in both the RSAR 30 and the TSAR 50, the A of the RSAR 30 is deleted in the HCIL 40, thereby the connections B and C are mapped to be connected to the TSAR 50.

Referring to FIG. 12, more detailed description of the above procedure is established forth hereinafter.

At step 1201 of deleting registration of a lookup memory, an ingress channel handle corresponding to an ingress connection label is read from an ingress connection table (see FIG. 3). Using ingress channel handle as an address, the ingress connection registration is deleted from the lookup memory 60. Thus, the connection mapping of the ingress and the egress connections is deleted.

At step 1202 of determining root connection termination, it is determined whether the VCC requested to terminate the connection terminates as the last connection in a multi point-to-point connection. That is, it is checked if the multi point-to-point connection group is deleted entirely, which can be known by checking if there is one or more leaves of egress connection in an egress connection table (see FIG. 9). If there is, it means a certain ingress connection is mapped to the egress connection and used continuously. Therefore, the egress connection is not terminated, as a multi point-to-point connection group continues to exist.

At step 1203 and 1211 of determining the sameness of the ingress and the egress connections, it is determined whether the ingress and the egress connections have the same label value. If they have the same label value, only one connection should be terminated, as the ingress and the egress connections are the same. But if they don't, the ingress and the egress connections should be terminated, respectively.

At step 1204, 1208 and 1214 of terminating the ingress connection, the host 20 provides an RSAR channel identifier of the ingress connection corresponding to the ingress connection to the RSAR 30, requesting to terminate the connection. Also, it provides a TSAR channel identifier of the ingress connection corresponding to the ingress connection to the TSAR 50, terminating the connection. As the connection is established in both ways of the RSAR 30 and TSAR 50 while the ingress connection is being established, the connection should be deleted, respectively.

At steps 1206, 1209, 1212 and 1215 of deleting the ingress connection registration, the registration on the ingress connection is deleted from an ingress connection table (see FIG. 3).

At step 1205 of terminating the egress connection, the host 20 provides an RSAR channel identifier of the egress connection corresponding to the egress connection to the RSAR 30, terminating the connection. And it provides a TSAR channel identifier of the egress connection corresponding to the egress connection to the TSAR 50, terminating the connection. As the connection is established in both ways of the RSAR 30 and TSAR 50 while the egress connection is being established, the connection should be deleted, respectively.

At step 1207 and 1210 of deleting registration on the egress connection, the registration information on the egress connection is deleted from an egress connection table (see FIG. 9).

At step 1213 and 1216 of modifying the egress connection registration, the number of leaves of the egress connection decreases by as much as 1 in an egress connection table (see FIG. 9).

Figure 13A:
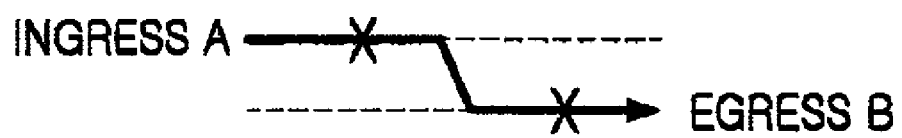
FIGS. 13A and 13B show types of terminating point-to-point connection, which is non-VC merging, in accordance with an embodiment of the present invention.
Figure 13B:
Figure 14:
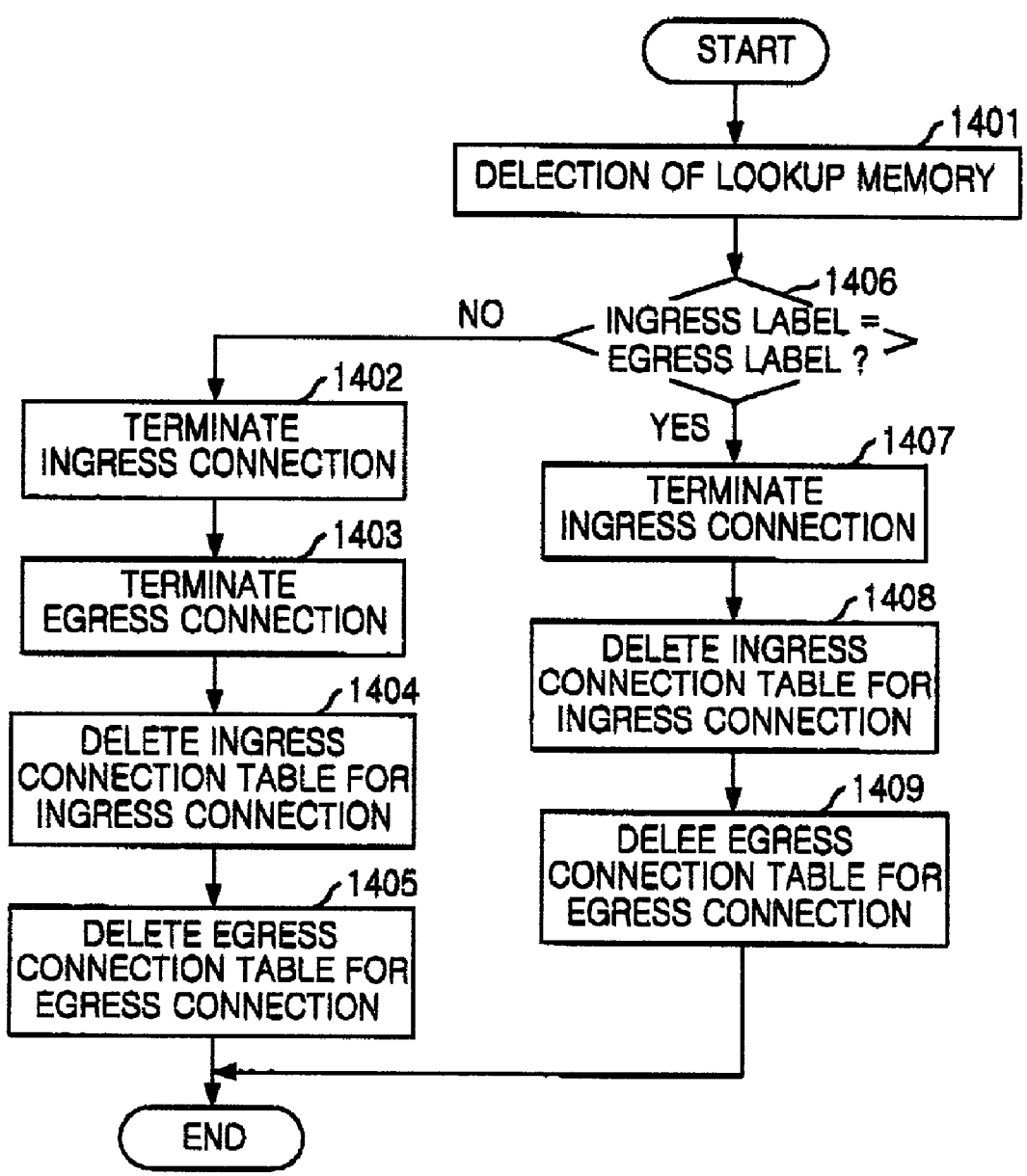
FIG. 14 is a detailed flow chart illustrating the procedure of terminating point-to-point connection, which is non-VC merging, in accordance with an embodiment of the present invention.

Meanwhile, a point-to-point connection (non-VC merging) doesn't have the idea of root and leaf in the multi point-to-point (VC merging) connection, and as shown in FIGS. 13A and 13B, it has two connection types, each of which is established through the procedure of FIG. 14.

One is, as shown in FIG. 13A, a termination procedure of when the ingress and the egress connection have different label values. That is, when ingress A is connected to egress B.

The other is, as shown in FIG. 13B, a termination procedure of where the egress and the egress connection have the same label value.

Referring to FIG. 14, more detailed description is established forth hereinafter.

At step 1401 of deleting a lookup memory registration, the ingress channel handle corresponding to an ingress connection label is read from the ingress connection table (see FIG. 3). And then, using the ingress channel handle as an address, ingress connection registration is deleted from the lookup memory 60. Thus, the mapping of the ingress and the egress connections is deleted.

At step 1406 of determining the sameness of the ingress and the egress connections, it is checked whether the ingress and the egress connections have the same label value. If they do, only one connection should be terminated, as the ingress and the egress connections are the same. But if they don't, the ingress and the egress connections should be terminated respectively.

At step 1402 and 1407 of terminating the ingress connection, the host 20 provides an RSAR channel identifier of the ingress connection to the TSAR 30, requesting to terminate the connection. Also, it provides a TSAR channel identifier of the ingress connection corresponding to the ingress connection to the TSAR 50, terminating the connection. As the connection is established in both ways of RSAR 30 and TSAR 50 while the ingress connection is being established, the connection should be deleted, respectively.

At steps 1404 and 1408 of deleting registration on the ingress connection, the registration on the ingress connection is deleted from the ingress connection table (FIG. 3).

At step 1403 of terminating the egress connection, the host 20 provides an RSAR channel identifier of the egress connection corresponding to the egress connection to the RSAR 30, terminating the connection Also, it provides a TSAR channel identifier of the egress connection corresponding to the egress connection to the TSAR 50, terminating the connection. As the connection is established in both ways c the RSAR 30 and the TSAR 50 while the egress connection is being established, it should be deleted, respectively.

At steps 1405 and 1409 of deleting registration on the ingress connection, the registration on the egress connection is deleted from an egress connection table (see FIG. 9).

In accordance with the present invention described above, using a device provided with an AAL5 SAR function, a VC merging apparatus required in an MPLS system can be embodied. When embodying a VC merging function using an SAR device, there is an advantage of connecting AAL5 frame users to one another because the AAL5 frame can possibly be converted. Thus, the MPLS network can be provided with flexibility. By establishing/terminating VC merging (multi point-to-point) or non-VC merging (point-to-point) connection, the VC merging apparatus adopting an SAR device can be applied to the MPLS network.

While the present invention has been described with respect to certain preferred embodiments, it will be apparent to those skilled in the art that various changes and modifications may be made without departing from the scope of the invention as defined in the following claims.

What is claimed is:

1. An apparatus for merging virtual connections in an LSR (Label Switching Router) system of an MPLS (Multiprotocol Label Switching) network, comprising:

control means for generating control signals to control an ingress connection or an egress connection in accordance with an order of connection establishment/termination from a central controller;

cell receiving means for establishing/terminating a multi point-to-point (VC merging) or a point-to-point (non-VC merging) connection and attaching an ingress channel handle to a header of cell payload received from upstream, based on the control signals from the control means;

header information converting means for receiving data having a payload and the ingress channel handle as a header from the cell receiving means, reading a TSAR channel identifier of the egress connection by using the ingress channel handle as an address of a lookup memory, and performing header conversion based on the control signals from the control means; and cell transmitting means for: 1) establishing/terminating the multi point-to-point (VC merging) or the point-to-point (non-VC merging) connection, 2) receiving data having the TSAR channel identifier of the egress connection and a payload from the header information converting means as a header, and 3) segmenting data having the TSAR channel identifier of the egress connection and payload from the header information converting means as a header into cells having an egress connection label as a header or generating cells having an egress connection label as a header according to the multi point-to-point or the point-to-point connection by using the TSAR channel identifier of the egress connection, thereby transmitting the cells downstream.

2. The apparatus as recited in claim 1, wherein the header information converting means maps header information for the multi point-to-point (VC merging) connection capable of transmitting data from a number of channels with the same destination or point-to-point (non-VC merging) connection.

3. The apparatus as recited in claim 2, wherein the control means manages the ingress or the egress connection by using an ingress connection table and an egress connection table.

4. The apparatus as recited in claim 3, wherein the ingress connection table includes information on the ingress connection channel handles, connection parameters, ingress connection labels, RSAR channel identifiers of the ingress connection, TSAR channel identifiers of the ingress connection, egress connection labels, egress channel handles, RSAR channel identifiers of the egress connection and TSAR channel identifiers of the egress connection.

5. The apparatus as recited in claim 3, wherein the egress connection table includes information on egress connection channel handles, connection parameters, the number of leaves, egress connection labels, RSAR channel identifiers of the egress connection and TSAR channel identifiers of the egress connection.

6. The apparatus as recited in claim 3, wherein the cell receiving means includes:

first storage means for storing the ingress channel handles and the connection parameters according to the kind of connection while establishing connection based on the control signals from the control means; and frame assembling means for assembling frames after receiving ATM cells from the upstream and the ingress channel handles and the connection parameters from the first storage means by using labels, VPI/VCI, as an address.

7. The apparatus as recited in claim 6, wherein the connection parameters include the distinction between multi point-to-point (VC merging) and point-to-point (non-VC merging) connections, and between differing types of AAL5 (ATM Adaptation Layer 5) frames.

8. The apparatus as recited in claim 7, wherein the frame assembling means retrieves AAL5 frames according to the kind of the AAL5 frames, attaches the ingress channel handle to the header of the AAL5 payload and transmits it while receiving MPLS cells, and wherein the frame assembling means attaches an ingress channel handle to the header of the ATM cell payloads without retrieving AAL5 cells and transmit it to the header information converting means while receiving ATM cells.

9. The apparatus as recited in claim 6, wherein the header information converting means receives data from the cell receiving means regardless of the kind of connections, the multi point-to-point or the point-to-point connection, reads a TSAR channel identifier of the egress connection from the lookup memory by using the ingress channel handle as an address, and transmits the data having the TSAR channel identifier of the egress connection and the payload from the cell receiving means as a header to the cell transmission means.

10. The apparatus as recited in claim 9, wherein the cell transmitting means includes:
   second storage means for storing the egress connection labels and the connection parameters for each TSAR channel identifier while establishing a connection based on the control signals from the control means; and
   frame segmentation means for receiving data having a TSAR channel identifier of the egress connection as a header from the header information converting means, and the egress connection label and the connection parameters transmitted from the second storage means using the TSAR channel identifier of the egress connection as an address, thereby segmenting the frames.

11. The apparatus as recited in claim 10, wherein in case of the multi point-to-point (VC merging) connection is received, the frame segmentation means generates AAL5 frames by using the payload transmitted from the header information converting means, and segments the generated frames into ATM cells having a first egress connection label as a header, thereby transmitting the ATM cells having the first egress connection label to downstream, and in case of the point-to-point (non-VC merging) connection, the first segmentation means generates ATM cells having a second egress connection label as a header without converting the payload, thereby transmitting ATM cells having the second egress connection label to downstream.

12. A connection establishing method of a VC merging apparatus in an LSR (Label Switching Router) system in an MPLS (Multiprotocol Label Switching) network, the method comprising the steps of;
   a) determining a kind of connection with reference to connection parameters when the connection is reguested to be established by a central controller;
   b) if the kind of connection is a VC merging connection, establishing a multi point-to-point connection based on an ingress and an egress connection labels; and
   c) establishing a point-to-point connection based on the ingress and the egress connection labels if the kind of connections is a non-VC merging connection,
   wherein the multi point-to-point connection includes:
      a first route connection in which the ingress connection label is different from the egress connection label;
      a second route connection in which the ingress connection label is equal to the egress connection label;
      a first leaf connection in which the ingress connection label is different from the egress connection label; and
      a second leaf connection in which the ingress connection label is equal to the egress connection label.

13. The connection establishing method as recited in claim 12, wherein the step b) of establishing multi point-to-point connection includes steps of:
   b1) determining whether a VCC (Virtual Channel Connection) requested to be established is established as a first connection of the multi point-to-point connection;
   b2) checking whether the ingress connection label is equal to the egress connection label;
   b3) establishing connections in both a RSAR and a TSAR by using the ingress connection label;
   b4) registering parameters on the ingress connection on an ingress connection table;
   b5) establishing connections in both the RSAR and the TSAR by using the egress connection label;
   b6) registering parameters on the egress connection on an egress connection table;
   b7) gradually increasing a number of leaves on the ingress connection table when the leaf is added;
   b8) gradually increasing a number of leaves for the egress connection of the egress connection table when the leaf is added; and
   b9) registering a TSAR channel identifier of the egress connection to the lookup memory by using an ingress channel handle as an address.

14. The connection establishing method as recited in claim 13, wherein the point-to-point connection includes:
   a first route connection in which the ingress connection label is different from the egress connection label; and
   a second route connection in which the ingress connection label is equal to the egress connection label.

15. The connection establishing method as recited in claim 14, the step c) of establishing the point-to-point connection includes the steps of:
   c1) checking whether the ingress connection label is equal to the egress connection label;
   c2) establishing connections in both the RSAR and the TSAR by using the ingress connection label;
   c3) registering parameters on the ingress connection on an ingress connection table;
   c4) establishing connections in both the RSAR and the TSAR by using the egress connection label;
   c5) registering parameters on the egress connection on an egress connection table; and
   c6) registering a TSAR channel identifier of the egress connection to the lookup memory by using the ingress channel handle as an address.

16. The connection establishing method as recited in claim 15, wherein the ingress connection table includes information on the ingress channel handles, connection parameters, the ingress connection labels, RSAR channel identifiers of the ingress connection, TSAR channel identifiers of the ingress connection, egress connection labels, egress channel handles, RSAR channel identifiers of the egress connection and TSAR channel identifiers of the egress connection.

17. The connection establishing method as recited in claim 15, wherein the egress connection table includes information on the egress channel handles, connection parameters, the number of leaves, egress connection labels, RSAR channel identifiers of the egress connection, TSAR channel identifiers of the egress connection.

18. A connection terminating method of a VC merging apparatus in an LSR (Label Switching Router) system of an MPLS (Multi protocol Label Switching), the method comprising the steps of:
   a) determining a kind of a connection with reference to connection parameters according to an order of connection termination from a central controller;
   b) terminating a multi point-to-point connection based on ingress/egress connection labels, if the kind of the connection is a VC merging connection; and c) terminating a point-to-point connection based on ingress/egress connection labels, if the kind of the connection is a non-VC merging connection, wherein the multi point-to-point connection includes:
- a first route connection in which the ingress connection label is different from the egress connection label;
- a second route connection in which the ingress connection label is equal to the egress connection label;
- a first leaf connection in which the ingress connection label is different from the egress connection label; and
- a second leaf connection in which the ingress connection label is equal to the egress connection label.

19. The connection terminating method as recited in claim 18, wherein the step b) of terminating the multi point-to-point connection includes the steps of:
- b1) determining whether a VCC (Virtual Channel Connection) requested to be established is terminated as the last connection of a multi point-to-point connection;
- b2) checking if the ingress connection label is equal to the egress connection label;
- b3) terminating a connection by providing an RSAR channel identifier of the ingress connection corresponding to the ingress connection to the RSAR, and terminating the connection by providing a TSAR channel identifier of the ingress connection corresponding to the ingress connection to the TSAR;
- b4) deleting registration on the ingress connection from an ingress connection table;
- b5) terminating the connection by providing an RSAR channel identifier of egress connection corresponding to the egress connection to the RSAR, and terminating the connection by providing a TSAR channel identifier of the egress connection corresponding to egress connection to the TSAR;
- b6) deleting registration on the egress connection from the egress connection table; and
- b7) gradually decreasing a number of leaves for the egress connection from the egress connection table.

20. The connection terminating method as recited in claim 19, wherein the point-to-point connection includes;
- a first route connection in which the ingress connection label is different from the egress connection label; and
- a second route connection in which the ingress connection label is equal to the egress connection label.

21. The connection terminating method as recited in claim 20, wherein the step c) of terminating point-to-point connection includes the steps of:
- c1) reading the ingress channel handle corresponding to the ingress connection label on the ingress connection table, and deleting the registration of the ingress connection from the lookup memory by using the ingress channel handle as an address;
- c2) checking if the ingress connection label is equal to the egress connection label;
- c3) terminating a connection by providing an RSAR channel identifier of the ingress connection corresponding to the ingress connection label to the RSAR, and terminating the connection by providing a TSAR channel identifier of the, ingress connection corresponding to the ingress connection label to the TSAR;
- c4) deleting registration on the ingress Connection from the ingress connection table;
- c5) terminating the connection by providing an RSAR channel identifier of the egress connection corresponding to the egress connection label to the RSAR, and terminating the connection by providing a TSAR channel identifier of the egress connection corresponding to the egress connection label to the TSAR; and
- c6) deleting registration on egress connection from the egress connection table.

22. The connection terminating method as recited in claim 21, wherein the ingress connection table includes information on ingress channel handles, connection parameters, ingress connection labels, RSAR channel identifiers of ingress connection, TSAR channel identifiers of ingress connection, egress channel handles, egress connection labels, RSAR channel identifiers of egress connection and TSAR channel identifiers of egress connection.

23. The connection terminating method as recited in claim 21, wherein the egress connection table includes information on egress channel handles, connection parameters, the number of leaves, egress connection labels, RSAR channel identifiers of egress connection, TSAR channel identifiers of egress connection.

* * * * *